(12) United States Patent
Heldberg et al.

(10) Patent No.: US 8,028,926 B2
(45) Date of Patent: Oct. 4, 2011

(54) THERMOSTAT VALVE ARRANGEMENT

(75) Inventors: Carsten Heldberg, Kirchlinteln (DE); Thomas Bäther, Walsrode (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 823 days.

(21) Appl. No.: 10/597,205

(22) PCT Filed: Jan. 12, 2005

(86) PCT No.: PCT/EP2005/000236
§ 371 (c)(1), (2), (4) Date: Jul. 17, 2007

(87) PCT Pub. No.: WO2005/068799
PCT Pub. Date: Jul. 28, 2005

(65) Prior Publication Data
US 2008/0135633 A1    Jun. 12, 2008

(30) Foreign Application Priority Data
Jan. 16, 2004   (DE) .................. 10 2004 002 995

(51) Int. Cl.
*G05D 23/00* (2006.01)
(52) U.S. Cl. ............. 236/101 C; 236/93 A; 236/93 R; 236/99 J; 236/100; 251/321; 251/323; 137/543.21
(58) Field of Classification Search ........... 236/93 R, 236/93 A, 99 J, 100, 101 C; 251/321, 323; 137/543.21
See application file for complete search history.

(56) References Cited

U.S. PATENT DOCUMENTS

| | | | |
|---|---|---|---|
| 2,996,254 A * | 8/1961 | Freismuth | 236/34 |
| 3,248,056 A | 4/1966 | Obermaier | |
| 3,409,039 A * | 11/1968 | Griffin | 137/516.29 |
| 4,630,770 A | 12/1986 | Sliger et al. | |
| 4,674,679 A * | 6/1987 | Saur | 236/34.5 |
| 6,471,133 B1 | 10/2002 | O'Flynn et al. | |

FOREIGN PATENT DOCUMENTS

| | | |
|---|---|---|
| DE | 9204611 U1 | 8/1993 |
| DE | 4231649 A1 | 3/1994 |
| DE | 19504677 A1 | 8/1995 |
| DE | 19646295 A1 | 5/1998 |
| JP | 08-082217 A | 3/1996 |
| JP | 11-117743 A | 4/1999 |
| WO | 03074911 A2 | 9/2003 |

OTHER PUBLICATIONS

English translation of DE 4231649 issued to Henschel.*
Notice of Reasons for Rejection for JP2006-548256 mailed Mar. 16, 2010.

* cited by examiner

*Primary Examiner* — Cheryl J Tyler
*Assistant Examiner* — Jonathan Bradford
(74) *Attorney, Agent, or Firm* — Lowe Hauptman Ham & Berner LLP

(57) ABSTRACT

A thermostat valve arrangement for the cooling circuit of an internal combustion engine includes a main valve member movably mounted in a housing adapted to be pressed against a main valve seat by a spring. The valve arrangement further includes a bypass valve member cooperating with a bypass valve seat in the housing. An expansion element has a first section cooperating with an abutment fixed to the housing and a second section cooperating with the main valve member and the bypass valve member such that the main valve or bypass valve is selectively closed and/or opened, in order to produce the cooling circuit of the internal combustion engine by means of a radiator or a bypass.

20 Claims, 2 Drawing Sheets

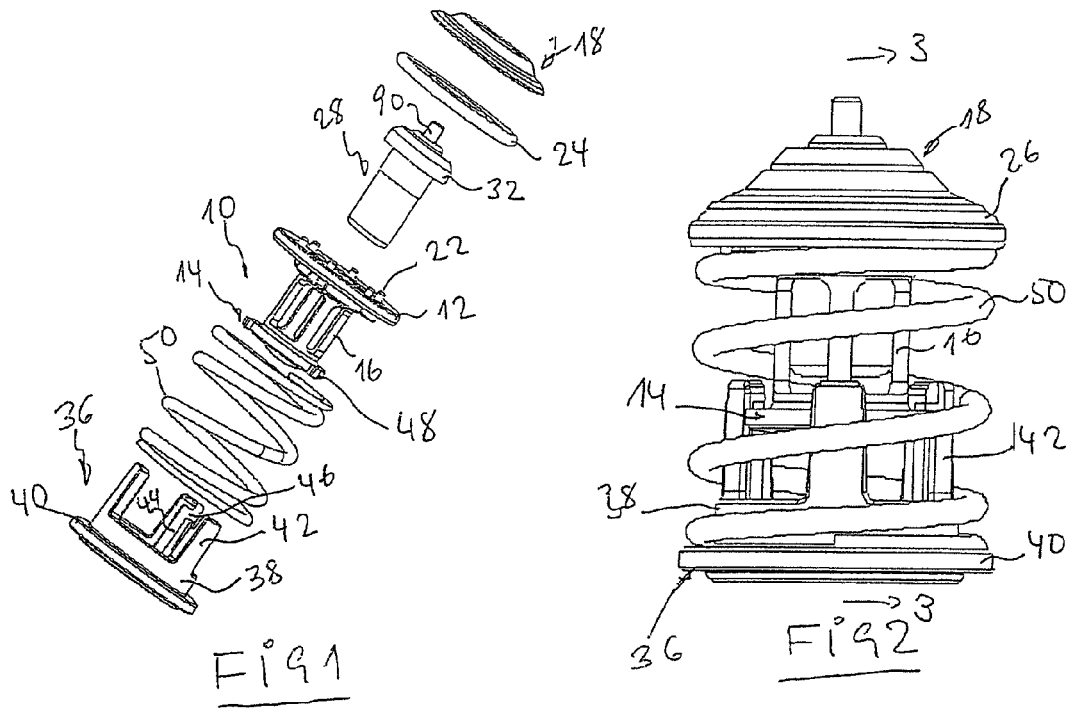
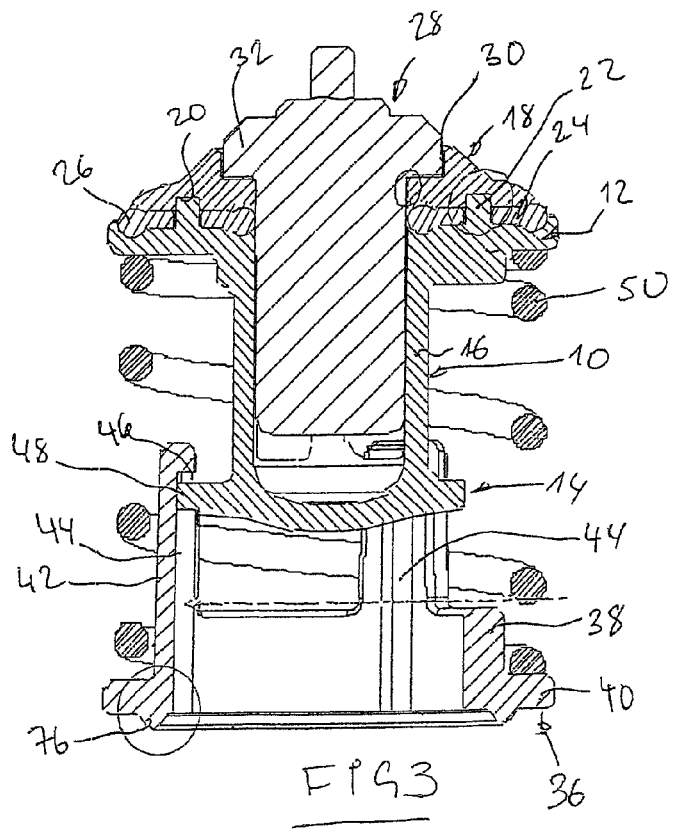

THERMOSTAT VALVE ARRANGEMENT

RELATED APPLICATIONS

The present application is a National Phase entry of International Application Number PCT/EP2005/000236, filed Jan. 12, 2005, which claims priority from, German Application Number 10 2004 002 995.4, filed Jan. 16, 2004, the disclosure of which is hereby incorporated by reference herein in its entirety.

The invention relates to a thermostat valve arrangement according to claim 1.

It is known to arrange a thermostat in the cooling circuit of an internal combustion engine. The thermostat either opens the path of the coolant from the engine through the radiator or alternatively to a bypass. In the latter, the coolant is not cooled in the radiator. This is, for example, the case in the warm-up period of the internal combustion engine. Thermostats of the disclosed type operate temperature-dependently in the known manner. If the coolant has reached a predetermined temperature, the thermostat opens the path to the radiator and closes the bypass.

Conventional thermostat valves comprise a cup-shaped retaining plate which comprises retaining clips on opposing sides. The upper retaining clip serves to receive an abutment for an expansion element. The expansion element is located in a valve disc made of metal which is covered by a rubber seal. The valve disc co-operates with a valve seat in the retaining plate. The retaining clip on the underside is an abutment for the valve spring, which bears against the valve disc. A further valve disc is fastened to the underside on the expansion element and which valve disc moves axially with the expansion element and is biased by a second compression spring. These valve discs form the bypass valve. The main and bypass valves move in opposing directions to one another, i.e. when the main valve is closed, the bypass valve is opened and vice versa. The second compression spring serves to absorb overtravel of the expansion element when the bypass valve is closed when the temperature increases further.

A disadvantage with the conventional construction is, on the one hand, the high flow resistance which is caused by the upper retaining clip and, on the other hand, the relatively large diameter of the retaining plate.

The object of the invention is to provide a thermostat valve arrangement for the cooling circuit of internal combustion engines, with which the flow conditions may be improved and the diameter of the arrangement reduced. Moreover, the thermostat valve arrangement is intended to be produced from plastics parts.

This object is achieved by the features of claim 1.

In the thermostat valve arrangement according to the invention, the main valve seat is formed from a conical seat surface. The housing is, as usual, a part of the pipe connection in the cooling circuit. In the valve arrangement according to the invention, the valve seat may be configured on a cover or the like which may be screwed to the housing receiving the remaining parts or otherwise sealingly connected therewith.

According to the invention, it is further provided that the main valve member, together with an axially spaced piston-shaped bypass valve member, forms a valve unit which therefore has to be configured to be axially adjustable in the housing, in order to open the main valve or the bypass valve. The valve unit receives the expansion element, so that it is axially secured in one direction whilst a further section of the expansion element is supported by an abutment of the housing. If, as already mentioned, the main valve seat is configured in a cover or the like, it is also expedient to arrange the abutment in such a cover and, for example, to configure said abutment as an internal part of the cover section of the cover. When the expansion element expands, the main valve is therefore opened, whilst the bypass valve is closed. To this end, the bypass valve member is of piston-shaped configuration and co-operates with a hollow cylindrical section of a guide component, which is arranged fixed to the housing. The valve unit, therefore, has to be axially adjustable relative to the guide component, co-operating stops of both parts ensuring that the movement of both parts away from each other is limited. This is necessary as the valve spring, which biases the valve unit away from the guide component, is arranged between the two parts.

The disclosed components which, apart from the valve spring and the expansion element, may be formed from plastics, may be preassembled in an appropriate manner before they are inserted into the housing. In the event of failure, the thermostat valve arrangement according to the invention may be easily removed and replaced by another. The cost of manufacturing the valve arrangement according to the invention is low. Moreover, it requires small constructional space. The valve arrangement is, moreover, streamlined as unnecessary flow resistances are eliminated. As the bypass valve member does not bear against a fixed valve seat but is able to move freely in a restricted manner in the hollow cylindrical section of the guide component, a second spring for the bypass valve member is not necessary. The overtravel of the expansion element is easily absorbed by an axial adjustment of the piston-shaped bypass valve member. As the seal in the region of the bypass valve does not have to be particularly good, it is sufficient if the piston-shaped bypass valve member is guided smoothly in the hollow cylindrical section.

According to an embodiment of the invention, the main valve member comprises two coaxial plates which may be connected to one another and which receive a sealing ring between one another which may be brought into engagement with a conical seat surface of the main valve seat. The main valve for a thermostat has to close tightly. The arrangement of plastics against plastics or metal against metal would not fulfil this requirement. Therefore, a sealing ring or a sealing disc is provided in this embodiment of the invention. The two plates or discs which receive the sealing ring between one another, may be connected to one another in a suitable manner, for example via a snap-in connection, snapping the pin of the one plate into corresponding holes of the other plate.

According to a further embodiment of the invention, it is provided that the expansion element comprises a shaft which, on the end facing the main valve seat, has a radial flange which is received in a complementary recess of the plate which faces said flange. During preassembly, it is merely required to insert the expansion element into the main valve member, the greatest length of the axial shaft of the expansion element being located within the region which is located between the main valve member and the bypass valve member which, as already mentioned, is connected to the main valve member. This connection is advantageously carried out according to a further embodiment of the invention via a plurality of axially parallel projections which form a type of cage.

According to a further embodiment of the invention, the guide component comprises at least one axially parallel groove which extends into the hollow cylindrical section and which, on the end facing the piston-shaped bypass valve member, comprises a section which is open toward the side. The piston-shaped bypass valve member comprises a radial lug which may be introduced into the groove via the lateral section of the groove in the style of a bayonet connection. In this manner, on the one hand, the bypass valve member and the valve unit as a whole, made up of the main and bypass valve members, is guided and at the same time the movement of these two parts away from each other is limited. In this connection, a further embodiment of the invention provides that the guide component comprises a plurality of axially parallel attachments or arms, spaced apart from one another in the peripheral direction, in which one respective guide groove is configured. It is understood that the piston-shaped bypass valve member has a corresponding number and arrangement of radial projections and/or lugs which co-operate with the guide grooves.

The guide component is supported in the housing on a suitable surface. According to one embodiment of the invention this surface comprises an annular groove which co-operates with an annular rib or the like of the guide component, in order to centre said guide component in the housing.

An embodiment of the invention is described in more detail hereinafter with reference to the drawings, in which:

FIG. 1 shows an exploded view of a unit which may be preassembled for a thermostat valve arrangement according to the invention.

FIG. 2 shows a side view of the assembly of the parts according to FIG. 1.

FIG. 3 shows a section through the view according to FIG. 2 along the line 3-3.

Figure 4:
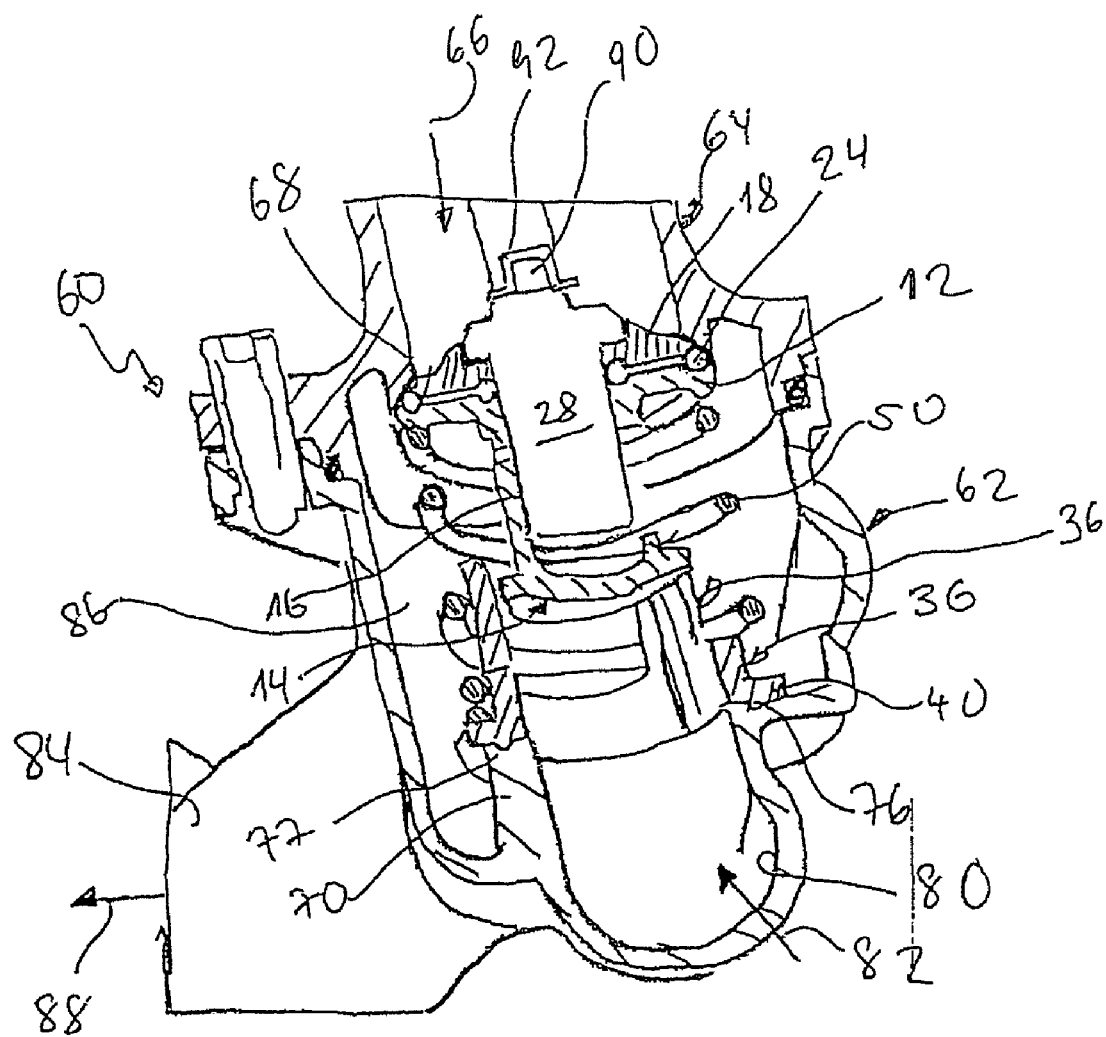
FIG. 4 shows a perspective view of the arrangement of the unit according to FIGS. 1 to 3 in a valve housing.

A one-piece element 10 formed from plastics may be seen in FIG. 1 which comprises a first clamping plate 12 and a piston-shaped valve member 14. The piston-shaped valve member 14 is connected via axially parallel webs 16 to the first clamping plate 12. A conical second clamping plate 18 comprises a series of recesses 20 which are formed on the underside (FIG. 3) and are arranged in a circle concentrically to the axis. The clamping plate 12 comprises clamping pins 22 which are arranged and formed to match the recesses 20. The recesses 20 and the pins 22 form a snap connection which is not shown individually in more detail. They may also be connected to one another by welding or the like. With this connection, a sealing ring 24 is arranged and clamped between the plates 12, 18 and which, on the periphery, comprises a bead 26 which is circular in section. On the outside, the bead 26 projects slightly over the plate 12, 18, which will be described in more detail below.

As is visible from FIG. 3, an expansion element 28 of known construction is received by the assembled parts composed of the unit 10, sealing ring 24 and clamping plates 12, 18. The clamping plate 18 comprises a circular recess 30 in which an upper radial flange 32 of the expansion element 28 is received. The elongate shaft of the expansion element 28 extends through a central opening in the sealing ring 24 and in the lower plate 12 in the region between the projections 16.

A guide component 36 comprises a cylindrical section 38 on which a radial flange 40 is formed on the lower end. On the end opposing the flange 40, three axially parallel arms 42 are formed on the cylindrical section 38. As is revealed from viewing FIGS. 1 and 3 together, the arms 42 on the inner face have one respective axially parallel groove 44 which, in the region of the free end of the arm 42, has a section 46 open to the side. The piston-shaped valve member 14 has a diameter which approximately corresponds to the internal diameter of the cylindrical section 38. As may be seen, the grooves 44 also extend into the cylindrical section 38. The piston-shaped bypass valve member 14 comprises radial lugs as is shown at 48 in FIGS. 1 and 3.

The lugs are formed and arranged such that they are received approximately suitably by the grooves 44. So that the lugs 48 enter the grooves 44, they are retained relative to the lateral sections 48 such that by relative rotation of the guide component and unit 20, the lugs 48 enter the upper end of the grooves 44. As a result, the components shown in FIG. 1 are connected to one another. Before the disclosed connection of the unit 10 to the guide component 36, a valve spring 50 is arranged therebetween, the valve spring being supported on the one hand on the flange 40 and on the other hand on the plate 12.

The unit shown in FIGS. 1 to 3 and assembled according to FIGS. 2 and 3 is fitted in a valve housing 60 according to FIG. 4, which is made up of a lower housing part 62 and a cover part 64. The cover part 64 is not shown with the upper end which, in the known manner, is connected to the pipe which leads to the radiator (not shown) of the internal combustion engine (not shown). The flow of coolant is indicated by the arrow 66. In the cover part 64 which is sealingly connected in a suitable manner to the lower housing part 62, a conical valve seat 68 is formed. The seat surface co-operates with the sealing bead 26 of the sealing ring 24.

In the lower housing part 62, an annular base 70 is formed which comprises an annular support surface with an annular groove 77 which is triangular in cross-section. As is revealed, in particular, from FIG. 3, on the underside of the flange 40 an annular rib 76 is formed which is triangular in cross-section. The annular rib 76 engages in the annular groove 77, whereby the guide component 36 is centred and arranged supported in the lower housing part 62. Within the annular base 70, of which the internal diameter approximately corresponds to the internal diameter of the cylindrical section 36, a lateral inlet 80 is provided for the coolant which comes from the bypass (not shown) of the cooling system of the internal combustion engine, as indicated by the arrow 82. A further outlet 84 is connected to the chamber 86 of the lower housing part 62 for the diversion of the coolant to the coolant pump, as indicated by arrow 88.

During assembly of the unit according to FIGS. 2 and 3, when the cover part 64 is removed, said unit is inserted in the lower housing part 62, the guide component 36 being supported on the annular surface of the base 70 and the annular rib 76 engaging in the annular groove 77. Subsequently, the cover part 64 is positioned and sealingly connected to the lower housing part 62, an axial pressure being exerted on the upper plate 18 via the seat surface 68, whereby the spring 50 is biased. The arrangement is such that the piston-shaped valve member 14 which is a bypass valve member, is located outside the cylindrical section 38. As a result, the bypass valve is opened and the coolant coming from the engine may flow according to the arrow 82 via the opened bypass valve into the chamber 86 and to the outlet 84 according to arrow 88 to the coolant pump. If the temperature of the coolant, for example engine coolant, rises, the expansion element 28 which co-operates with its upper section 90 on an abutment 92 in the cover part 64, expands and, as a result, presses the plate arrangement 18, 12 and the sealing ring 24 downwards out of engagement with the main valve seat 68. At the same time, the piston-shaped bypass valve member 14 closes the bypass valve by plunging into the cylindrical section 38.

By installing the arrangement in the housing 60, the arms 42 of the guide component 36 are relieved of the forces of the spring 50, as the spring 50 is slightly compressed by the cover part 64. Nevertheless, torsional lock is achieved between the guide component and the unit 10.

As may be seen in particular from FIG. 4, a streamlined arrangement is produced which allows the diameter of the entire thermostat to be reduced, without increasing the flow resistance.

The invention claimed is:

1. A thermostat valve arrangement for a cooling circuit of an internal combustion engine, the thermostat valve arrangement comprising:
   a housing having a main conical sealing valve seat;
   a guide component supported by the housing and having a hollow cylindrical section;
   a main valve member movably engageable with the main conical sealing valve seat formed on the housing;
   a bypass valve member spaced from the main valve member in an axial direction of the main valve member and movably engageable with the hollow cylindrical section of the guide component;
   an expansion element within the housing having a first section and a second section, said first section cooperable with an abutment fixed to the housing and said second section cooperable with the main valve member and the bypass valve member in the axial direction of the main valve member such that the main valve or the bypass valve is selectively closed or open to produce the cooling circuit of the internal combustion engine; and
   a valve spring between the main valve member and the guide component,
   wherein
   when the main valve member is closed, the main valve member is biased by the valve spring to be directly engaged with the main valve seat, and the bypass valve member is disengaged from the hollow cylindrical section of the guide component;
   when the main valve member is open, the main valve member is pressed by an expansion of the expansion element and disengaged from the main valve seat, and the bypass valve member is pressed by the expansion of the expansion element into the hollow cylindrical section of the guide component,
   wherein
   said guide component includes a radial flange integrated with the hollow cylindrical section and projecting radially away from the expansion element,
   said valve spring surrounds the expansion element and the entirety of the hollow cylindrical section and up to the radial flange, wherein the guide component comprises at least one guide groove parallel to the axial direction of the main valve member and extending into the hollow cylindrical section, and said guide groove includes a section facing the bypass valve member, and
   the bypass valve member comprises a radial lug introduced into the section of the guide groove in a bayonet connection.

2. The thermostat valve arrangement according to claim 1, wherein the main valve member comprises
   a first plate and a second plate coaxially connected to the first plate, and
   a sealing ring sandwiched between the two plates and directly engageable with the main conical sealing valve seat.

3. The thermostat valve arrangement according to claim 2, wherein the first and second plates are connected to one another in a snap connection.

4. The thermostat valve arrangement according to claim 3, wherein the expansion element comprises a shaft at the first section facing the main valve seat and a radial flange at the second section received in a complementary recess of the first plate which faces said flange.

5. The thermostat valve arrangement according to claim 1, wherein the main valve member is connected to the bypass valve member via a plurality of axially parallel projections in the axial direction of the main valve member.

6. The thermostat valve arrangement according to claim 5, wherein the second plate facing the bypass valve member is connected with the bypass valve member via the projections, and the second plate, the projections and the bypass valve member are an integral component.

7. The thermostat valve arrangement according to claim 1, wherein the valve spring is directly supported by the radial flange.

8. The thermostat valve arrangement according to claim 2, wherein
   the first plate comprises a plurality of recesses formed on a side of the first plate facing the second plate, and
   the second plate comprises a plurality of pins passing through the sealing ring and directly engageable with the plurality of recesses of the first plate.

9. The thermostat valve arrangement according to claim 1, wherein the guide component has a section opposite to the radial flange in the axial direction, said section being engageable with the bypass valve member, and
   the bypass valve member is freely movable within the hollow cylindrical section between said section of the guide component and the radial flange.

10. A thermostat valve arrangement for a cooling circuit of an internal combustion engine, the thermostat valve arrangement comprising:
    a housing having a main conical sealing valve seat;
    a guide component supported by the housing and having a hollow cylindrical section;
    a main valve member movably engageable with the main conical sealing valve seat formed on the housing;
    a bypass valve member spaced from the main valve member in an axial direction of the main valve member and movably engageable with the hollow cylindrical section of the guide component;
    an expansion element within the housing having a first section and a second section, said first section cooperable with an abutment fixed to the housing and said second section cooperable with the main valve member and the bypass valve member in the axial direction of the main valve member such that the main valve or the bypass valve is selectively closed or open to produce the cooling circuit of the internal combustion engine; and
    a valve spring between the main valve member and the guide component and surrounding the expansion element and the guide component,
    wherein
    when the main valve member is closed, the main valve member is biased by the valve spring to be directly engaged with the main valve seat, and the bypass valve member is disengaged from the hollow cylindrical section of the guide component;
    when the main valve member is open, the main valve member is pressed by an expansion of the expansion element and disengaged from the main valve seat, and the bypass valve member is pressed by the expansion of the expansion element into the hollow cylindrical section of the guide component,
    wherein the guide component comprises at least one guide groove parallel to the axial direction of the main valve member and extending into the hollow cylindrical section, and said guide groove includes a section facing the bypass valve member, and the bypass valve member comprises a radial lug introduced into the section of the guide groove in a bayonet connection.

11. The thermostat valve arrangement according to claim 10, wherein the guide component comprises a plurality of arms parallel to the axial direction of the main valve member and spaced apart from one another in a peripheral direction of the guide component, wherein said guide component includes multiple said guide grooves each of which is configured in a respective one of the arms.

12. The thermostat valve arrangement according to claim 10, wherein the main valve member comprises
   a first plate and a second plate coaxially connected to the first plate, and
   a sealing ring sandwiched between the two plates and directly engageable with the conical sealing valve seat.

13. The thermostat valve arrangement according to claim 12, wherein the first and second plates are connected to one another in a snap connection.

14. The thermostat valve arrangement according to claim 13, wherein the expansion element comprises a shaft at the first section facing the main valve seat and a radial flange at the second section received in a complementary recess of the first plate which faces said flange.

15. The thermostat valve arrangement according to claim 12, wherein the main valve member is connected to the bypass valve member via a plurality of axially parallel projections in the axial direction of the main valve member.

16. The thermostat valve arrangement according to claim 15, wherein the second plate facing the bypass valve member is connected with the bypass valve member via the projections, and the second plate, the projections and the bypass valve member are an integral component.

17. The thermostat valve arrangement according to claim 10, wherein the guide component comprises a radial flange projecting away from the expansion element and on which the valve spring is directly supported.

18. The thermostat valve arrangement according to claim 10, wherein the housing further comprises an annular groove supporting the guide component, and the guide component comprises a projection or an annular rib cooperating with the annular groove to be supported by the guide component.

19. A thermostat valve arrangement for a cooling circuit of an internal combustion engine, the thermostat valve arrangement comprising:
   a housing having a main conical sealing valve seat;
   a guide component supported by the housing and having a hollow cylindrical section;
   a main valve member movably engageable with the main conical sealing valve seat formed on the housing;
   a bypass valve member spaced from the main valve member in an axial direction of the main valve member and movably engageable with the hollow cylindrical section of the guide component;
   an expansion element within the housing having a first section and a second section, said first section cooperable with an abutment fixed to the housing and said second section cooperable with the main valve member and the bypass valve member in the axial direction of the main valve member such that the main valve or the bypass valve is selectively closed or open to produce the cooling circuit of the internal combustion engine; and
   a valve spring between the main valve member and the guide component and surrounding the expansion element and the guide component,
   wherein
   when the main valve member is closed, the main valve member is biased by the valve spring to be directly engaged with the main valve seat, and the bypass valve member is disengaged from the hollow cylindrical section of the guide component;
   when the main valve member is open, the main valve member is pressed by an expansion of the expansion element and disengaged from the main valve seat, and the bypass valve member is pressed by the expansion of the expansion element into the hollow cylindrical section of the guide component,
   wherein
   the housing further comprises an annular groove supporting the guide component, and
   the guide component comprises a projection or an annular rib cooperating with the annular groove to be supported by the guide component.

20. A thermostat valve arrangement for a cooling circuit of an internal combustion engine, the thermostat valve arrangement comprising:
   a housing having a main conical sealing valve seat;
   a guide component supported by the housing and having a hollow cylindrical section;
   a main valve member movably engageable with the main conical sealing valve seat formed on the housing;
   a bypass valve member spaced from the main valve member in an axial direction of the main valve member and freely moveable within the hollow cylindrical section of the guide component;
   an expansion element within the housing having a first section and a second section, said first section cooperable with an abutment fixed to the housing and said second section cooperable with the main valve member and the bypass valve member in the axial direction of the main valve member such that the main valve or the bypass valve is selectively closed or open to produce the cooling circuit of the internal combustion engine; and
   a valve spring between the main valve member and the guide component and surrounding the expansion element and the entire hollow cylindrical section of the guide component,
   wherein
   when the main valve member is closed, the main valve member is biased by the valve spring to be directly engaged with the main valve seat, and the bypass valve member is disengaged from the hollow cylindrical section of the guide component;
   when the main valve member is open, the main valve member is pressed by an expansion of the expansion element and disengaged from the main valve seat, and the bypass valve member is pressed by the expansion of the expansion element into the hollow cylindrical section of the guide component, wherein the guide component comprises at least one guide groove parallel to the axial direction of the main valve member and extending into the hollow cylindrical section, and said guide groove includes a section facing the bypass valve member, and
   the bypass valve member comprises a radial lug introduced into the section of the guide groove in a bayonet connection.

* * * * *